(12) United States Patent
Van Niekerk et al.

(10) Patent No.: US 10,805,540 B2
(45) Date of Patent: Oct. 13, 2020

(54) QUADCOPTER WITH PITCHED PROPELLER CONFIGURATION

(71) Applicant: Vantage Robotics, LLC, San Francisco, CA (US)

(72) Inventors: Johannes Becker Van Niekerk, Livermore, CA (US); Tobin Fisher, San Francisco, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 550 days.

(21) Appl. No.: 15/336,649

(22) Filed: Oct. 27, 2016

(65) Prior Publication Data

US 2017/0121034 A1    May 4, 2017

Related U.S. Application Data

(60) Provisional application No. 62/247,567, filed on Oct. 28, 2015.

(51) Int. Cl.
*H04N 5/232* (2006.01)
*B64C 39/02* (2006.01)
*H04N 5/225* (2006.01)

(52) U.S. Cl.
CPC ....... *H04N 5/23267* (2013.01); *B64C 39/024* (2013.01); *H04N 5/2257* (2013.01); *B64C 2201/027* (2013.01); *B64C 2201/108* (2013.01); *B64C 2201/127* (2013.01); *B64C 2201/14* (2013.01)

(58) Field of Classification Search
CPC ........ B64C 2201/027; B64C 2201/108; B64C 2201/127; B64C 2201/14
See application file for complete search history.

(56) References Cited

U.S. PATENT DOCUMENTS

| 2015/0229813 | A1* | 8/2015 | Isaac-Lowry | ........ | H04N 5/2252 |
| | | | | | 348/376 |
| 2015/0298822 | A1* | 10/2015 | Eline | .................... | B64C 39/024 |
| | | | | | 244/75.1 |
| 2016/0023755 | A1* | 1/2016 | Elshafei | ................. | G08G 5/025 |
| | | | | | 244/17.13 |
| 2016/0313734 | A1* | 10/2016 | Enke | ....................... | H04L 67/12 |
| 2017/0075351 | A1* | 3/2017 | Liu | ....................... | H04N 5/2328 |
| 2017/0152060 | A1* | 6/2017 | Morisawa | ........... | H04N 5/2252 |
| 2018/0065736 | A1* | 3/2018 | Sebesta | ................... | B64D 47/08 |

FOREIGN PATENT DOCUMENTS

| JP | 2014-103527 | * | 5/2014 | ............. B64C 27/08 |

* cited by examiner

*Primary Examiner* — Philip J Bonzell
*Assistant Examiner* — Tye William Abell
(74) *Attorney, Agent, or Firm* — Knobbe, Martens, Olson & Bear, LLP (57) ABSTRACT

A quadcopter has a fuselage and four rotors, each defining a thrust vector. An onboard camera system includes a gimbal with a roll axis and a pitch axis. Right side motors are mounted with a dihedral angle so that their respective thrust vectors intersect at a common focal point located above the fuselage. Left side motors are mounted with a dihedral angle so that their respective thrust vectors intersect at a common focal point located above the fuselage. The tilted thrust vectors provide yaw stability which allows flight yaw control to be used as yaw control of the onboard camera.

20 Claims, 5 Drawing Sheets

QUADCOPTER WITH PITCHED PROPELLER CONFIGURATION

CROSS-REFERENCE TO RELATED APPLICATIONS

This application claims the benefit of U.S. Provisional Application No. 62/247,567, filed Oct. 28, 2015, and entitled QUADCOPTER WITH ANGLED THRUST PODS, the disclosure of which is hereby incorporated by reference in its entirety.

BACKGROUND

Technical Field

Embodiments described herein relate generally to unmanned aerial vehicles. More particularly, embodiments described herein relate to improved power drive arrangements used in such vehicles.

Description of the Related Art

Unmanned aerial vehicles (UAV's) have been commercially available and recreationally used for many years, with radio-controlled airplanes and helicopters being the most popular. Unfortunately, these early UAV designs were inherently complicated to assemble and maintain, expensive, and difficult to operate during flight. Adding to this, owing to the technology available at the time, a typical flight time of these earlier vehicles was usually under 6 minutes or so, resulting in a lot of expense and effort for very little flying return. As a result, these older UAVs were really only used by a small impassioned subset of the population—RC enthusiasts.

Recent advances in various supportive technologies, including batteries having a much higher power to weight ratio, smaller, lighter and more powerful electric motors, advances in GPS, low-power circuitry, improved sensors, improved flight control systems, and availability of stronger and lighter structural materials, such as carbon-fiber, paved the way for improved and more versatile UAVs. In response to the many advances in the supporting technologies for UAVs, there have been many new designs with new propeller drive configurations. Among these are multicopters, which are equipped with more than one drive motor and propeller. Electronic speed control (ESC) controls the speed of the motors, in response to control commands to control flight direction, speed, and vehicle roll, yaw, and pitch. Of course, each drive configuration has its specific benefits and disadvantages, but the so-called quad-copter is the most popular today. Although four rotors are sufficient to provide independent control of six degrees of freedom without additional actuation beyond controlling motor speed, larger numbers of rotors can be used to similar effect. One very popular payload of today's UAVs is a digital video camera.

SUMMARY

In one aspect, an unmanned aerial vehicle (UAV) is disclosed, including a UAV body; a first rotor supported by the UAV body and oriented to generate thrust along a first thrust vector which does not intersect a yaw axis of the UAV body; a second rotor supported by the UAV body, the second rotor oriented to generate thrust along a second thrust vector, the second thrust vector oriented at an angle to the first thrust vector; and a two-axis gimbal supported by the UAV body.

The UAV can additionally include a third rotor supported by the UAV body on the opposite side of the UAV body as the first rotor, the third rotor oriented to generate thrust along a third thrust vector which does not intersect a yaw axis of the UAV body; and a fourth rotor supported by the UAV body and disposed on the same side of the UAV body as the third rotor, the fourth rotor oriented to generate thrust along a second thrust vector, the fourth thrust vector oriented at an angle to the third thrust vector. The UAV body can extend along a longitudinal axis, and the yaw axis of the UAV body can be substantially perpendicular to the longitudinal axis of the UAV body.

The UAV can additionally include a camera supported by the two-axis gimbal, wherein the camera is at least partially enclosed within the UAV body. The camera can be at least partially enclosed within the front of the UAV body. The UAV can additionally include electronic image stabilization circuitry configured to process image data from an image sensor supported by the two-axis gimbal to stabilize the image data. The UAV can additionally include an inertial measurement unit, wherein the inertial measurement unit is configured to provide data to the electronic image stabilization circuitry, and wherein the UAV is configured to utilize the inertial measurement unit to estimate the attitude of the two-axis gimbal. The UAV can be configured to use field oriented control to control the first and second rotors and transmit data regarding intentional movements of the UAV to the electronic image stabilization circuitry, and the electronic image stabilization circuitry can be configured to prevent dampening of intentional movements of the camera. The camera can include a lens and an image sensor, and wherein the electronic image stabilization circuitry is disposed within the UAV body. The UAV can additionally include a four lane MIPI camera serial interface configured to transmit image data from the camera supported by the two-axis gimbal.

The UAV can be configured to use field oriented control to control the first and second rotors. An included angle between the first and second thrust vectors can be between 4 and 40 degrees.

In one aspect, a quadcopter is disclosed, including a fuselage defining a longitudinal axis and containing a battery and controlling circuitry; two left-side rotors secured on the left side of said fuselage with an inwardly opposing pitch dihedral angle; and two right-side rotors secured on the right side of said fuselage with an inwardly opposing pitch dihedral angle.

The pitch dihedral angle can be between 2.0 and 20 degrees as measured from the vertical. The quadcopter can further include a video camera located within said fuselage. The quadcopter can further include a 2-axis gimbal support secured to said fuselage and located substantially within said fuselage. The quadcopter can further include a video camera secured to said 2-axis gimbal support and located within said fuselage. The quadcopter can further include electronic image stabilization for electronically stabilizing said video camera output signal.

In one aspect, a quadcopter is disclosed, including a fuselage defining a longitudinal axis, a yaw axis, and containing a battery and controlling circuitry; and four rotors connected to said fuselage, each of said rotors selectively generating thrust along a thrust vector; wherein at least two of said thrust vectors intersect at a point other than along said yaw axis.

In one aspect, a quadcopter is disclosed, including a fuselage defining a longitudinal axis, a yaw axis, and containing a battery and controlling circuitry; and four rotors connected to said fuselage, each of said rotors selectively generating thrust along a thrust vector; wherein said thrust vector of at least one rotor being orientated to generate a horizontal component of thrust about said yaw axis.

In one aspect, a quadcopter is disclosed, including a fuselage defining a longitudinal axis and containing a battery and controlling circuitry; two left-side rotors secured on the left side of said fuselage, each of said left-side rotor defining a thrust vector and a vertical left-side motor plane; two right-side rotors secured on the right side of said fuselage, each of said right-side rotors defining a thrust vector and a vertical right-side motor plane; wherein, said two left-side rotors are angled with respect to said longitudinal axis so that each thrust vector of each left side rotors intersects at a point above said rotors and within said left-side motor plane; and said two right-side rotors are angled with respect to said longitudinal axis so that each thrust vector of each right side rotors intersects at a point above said rotors and within said right-side motor plane, said angled right and left rotor creating a horizontal thrust component that provides stability in yaw displacement.

In one aspect, a UAV is disclosed comprising four or more rotors with the rotors tilted out of the horizontal plane such that the horizontal component of the thrust produces a thrust about the yaw axis.

The UAV may include a fuselage with components arranged mainly along a longitudinal axis. The UAV may include a 2-axis gimbal in the front of the fuselage where gimbal is used to stabilize a lens, image sensor, and electrical connection from this to a board for video processing. The UAV may use a four lane MIPI camera serial interface (CSI). The UAV may use electronic image stabilization (EIS) to further stabilize the video. The UAV may use field oriented control to control the motor speed. The UAV may use feedforward to avoid having the EIS dampen intentional movements. A single inertial measurement unit may be used for both EIS and gimbal attitude estimation.

The features of this invention, and the manner of attaining them, will become more apparent and the invention itself will be better understood by reference to the following description of the disclosed embodiments taken in conjunction with the accompanying drawings.

DETAILED DESCRIPTION

The lateral movement of quadcopters and other similar UAVs can be controlled via attitude changes that create a lateral component to the thrust. Some embodiments of UAVs include a video camera, while other embodiments of UAVs may provide a mount to receive and support a video camera. If a camera is attached to the UAV, these frequent attitude changes necessitate some sort of stabilization to the video for it to appear smooth and be pleasant to watch. In some embodiments, this stabilization can be provided via a gimbal and/or Electronic Image Stabilization (EIS).

Gimbals hold the camera at an attitude that can be controlled independently of the UAV attitude changes. Gimbals can have one, two, three or axes in order to control the camera's attitude in some combination of pitch, roll, and yaw. The cost, size, and weight of the gimbal increases as additional axes are added. While the additional cost, weight, and size are undesirable, many embodiments of airborne cameras utilize three axis gimbals to achieve smooth video in all axes.

Gimbals are usually mounted outside the quadcopter fuselage, usually hanging below the body and aligned with the yaw axis. This arrangement may be due to the large size of the gimbal and to avoid having any yaw movement from the UAV introduce lateral movement in the video image. However, such 3-axis gimbals for cameras restrict the form factor of the fuselage, reduce the in-flight performance of the quadcopter by increasing wind resistance, and often result in the propellers appearing in the camera field of view during large pitching movements.

Two axis gimbals are smaller, lighter, and less expensive than three axis gimbals. However, the use of a two-axis gimbal may include providing the "missing" axis movement by an axis movement of the fuselage, usually yaw. This can be done by carefully controlling the different quad motors during flight, but stable and accurate yaw movement of a UAV is difficult to achieve, usually leading to unwanted movements about the set-point, between 2 and 3 degrees, even in a well-tuned UAV.

Alternatively, Electronic Image Stabilization (EIS) can be used to stabilize the image using software. This technique shifts the electronic image from frame to frame of video, enough to counteract the motion. It uses pixels outside the border of the visible frame to provide a buffer for the motion. This technique reduces distracting movements from videos by smoothing the transition from one frame to another. The impact of EIS on image quality increases with greater movement from frame to frame, as additional pixels need to be cropped and warp can be introduced into the image, especially for pitching movements.

The dihedral effect can be used to provide stability to airplanes for roll and, in some cases, pitch. In some embodiments, an inward dihedral angle can be introduced to the four motors of a quadcopter (using angled motor mounts) so that the thrust vector of each motor intersects above the fuselage, at a point along the vertical yaw axis. This arrangement forces the direction of propulsion of the four motors to be down and out which does provide some passive stability about roll and pitch axes during flight. This arrangement does not, however, affect the specific stability of yaw motion of the fuselage because these dihedral motor arrangements do not provide a net sum thrust vector about the yaw axis. If a motor's thrust vector intersects vertical yaw axis, then the thrust from that motor cannot affect yaw motion of the vehicle, because no torque would be generated about the yaw axis. Embodiments of quadcopters and other UAVs which are configured to generate torque about the yaw axis may be used to provide improved yaw control during flight.

Some embodiments described herein relate to a UAV having a fuselage and multiple rotors, each defining a thrust vector. An onboard camera system includes a gimbal oriented to provide control and stabilization along a roll axis and/or a pitch axis of the quadcopter. Thrust motors are mounted such that the motor axis is at an angle relative to vertical, and such that a component of the thrust creates a moment about the yaw axis. In one embodiment, four motors are used with a pitch dihedral angle so that their respective thrust vectors for the left and right motor pairs intersect at a common focal point located above the fuselage and remote from the yaw axis of the quadcopter. Each of the motors can be controlled independently such that moments can be balanced for no yaw torque or imbalanced in order to create a toque about the yaw axis. The tilted thrust vectors provide increased control authority, which reduces yaw error and improves yaw stability, which in turn reduces the need for a yaw axis on the gimbal. The tilted thrust vectors allow the generation of torque about the yaw axis to provide yaw stability which, together with onboard electronic image stability control can allow flight yaw control to be used as yaw control of the onboard camera.

Such a motor arrangement enables a smaller, cheaper, and lighter gimbal to be used with the UAV. The increased yaw stability and smaller sized gimbal increase the flexibility on the gimbal location and enable the gimbal to be mounted in the front of the body of the UAV. Field Oriented Control (FOC) can be used to maximize the performance of the yaw control. Additionally, Electronic Image Stabilization (EIS) can be used to remove any slight yaw movements to keep the image perfectly stable, with minimal image degradation.

Figure 1:
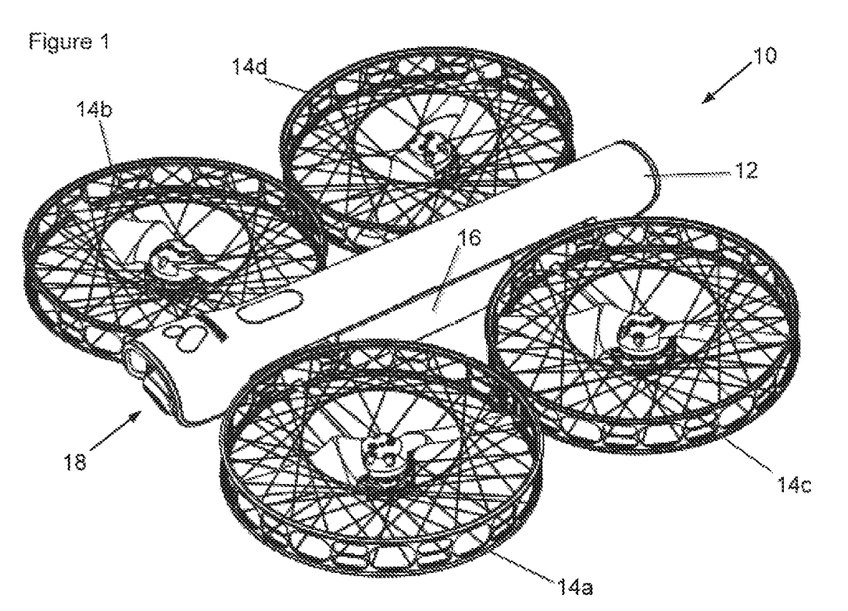
FIG. 1 is a perspective view of an exemplary quadcopter, showing four motor/propellers mounted to a fuselage.
Figure 2:
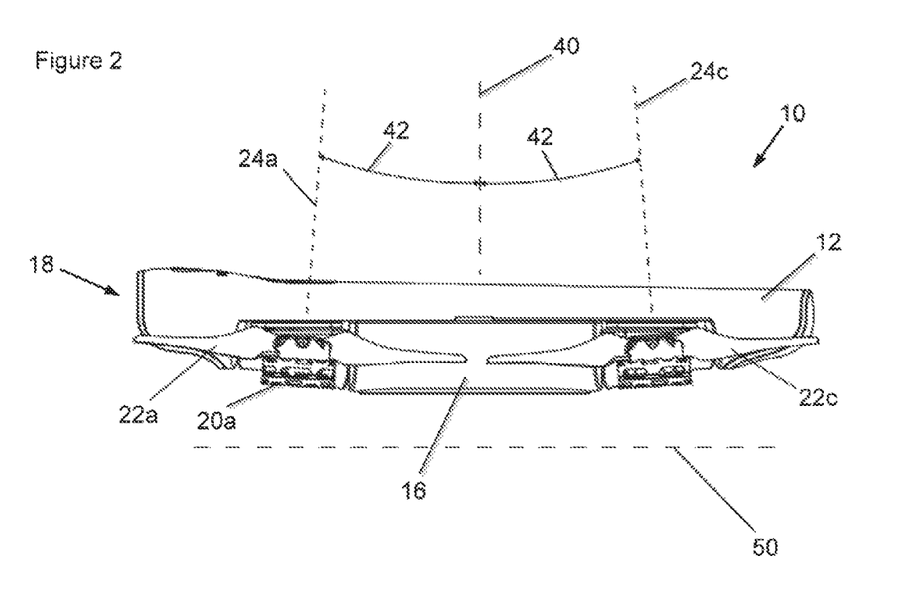
FIG. 2 is a side view of the quadcopter of FIG. 1, showing details of a dihedral angle between the motor/propellers and with respect to a vertical yaw axis.

Referring now to FIGS. 1 and 2, a quadcopter 10 is shown having a fuselage 12 and four connected rotors 14a, 14b, 14c, and 14d. Secured to or integrated within fuselage 12 is a battery pack 16 and a camera assembly 18. Each thrust rotor 14a-d includes a respective motor 20a-d and a respective propeller 22a-d. Each propeller 22a-d is mounted to the output shaft of the corresponding motor 20a-d. The output shaft of each motor 20a-d defines a thrust vector axis 24a-d (see FIG. 7), which is the direction along which thrust generated by the respective propeller will align during operation (produced by the propeller spinning at a substantial angular velocity).

A yaw axis 26 (shown in FIGS. 4 and 6) is the axis that quadcopter 10 will rotate about in yaw displacement and is usually perpendicular with respect to fuselage 12 and a horizontal reference line 50 (shown in FIG. 2). As is well known, battery pack 16 supplies power to all electronic components of quadcopter 10 including the four motors 20a-d, camera assembly 18 and any onboard controlling circuitry and sensors (not shown). Apart from certain details and improvements described herein, the general operation of quadcopter 10 may be similar to that described in U.S. Pat. Publication No. 2016/0221671 A1, the disclosure of which is incorporated by reference herein. Generally, onboard controlling circuitry selectively instructs the operation (effective thrust) of each motor 20a-d and propeller 22a-d which, in turn, forces quadcopter 10 to follow a specific and desired flight path and/or airborne orientation.

Because the level of yaw control is determined in part by the accuracy of controlling the propeller rotational speed, better control methods can lead to more precise yaw control. In some embodiments, Field Oriented Control (FOC) can be used to provide precise yaw control. FOC is a variable-frequency drive (VFD) control method in which the stator currents of a three-phase AC electric motor are identified as two orthogonal components that can be visualized with a vector. One of these orthogonal components defines the magnetic flux of the motor, and the other orthogonal component defines the torque. The control system of the drive can calculate the corresponding current component references from the flux and torque references given by the drive's speed control. In some embodiments, proportional-integral (PI) controllers can be used to keep the measured current components at their reference values. The pulse-width modulation of the variable-frequency drive can define the transistor switching according to the stator voltage references that are the output of the PI current controllers.

FOC can be used, for example, to control AC synchronous and induction motors. FOC was originally developed for high-performance motor applications which required smooth operation over the full speed range, the generation of full torque at zero speed, and high dynamic performance including fast acceleration and deceleration. However, FOC can also be used for lower performance applications, due to the reductions in motor size, cost and power consumption which can be provided by the use of FOC.

Figure 6:
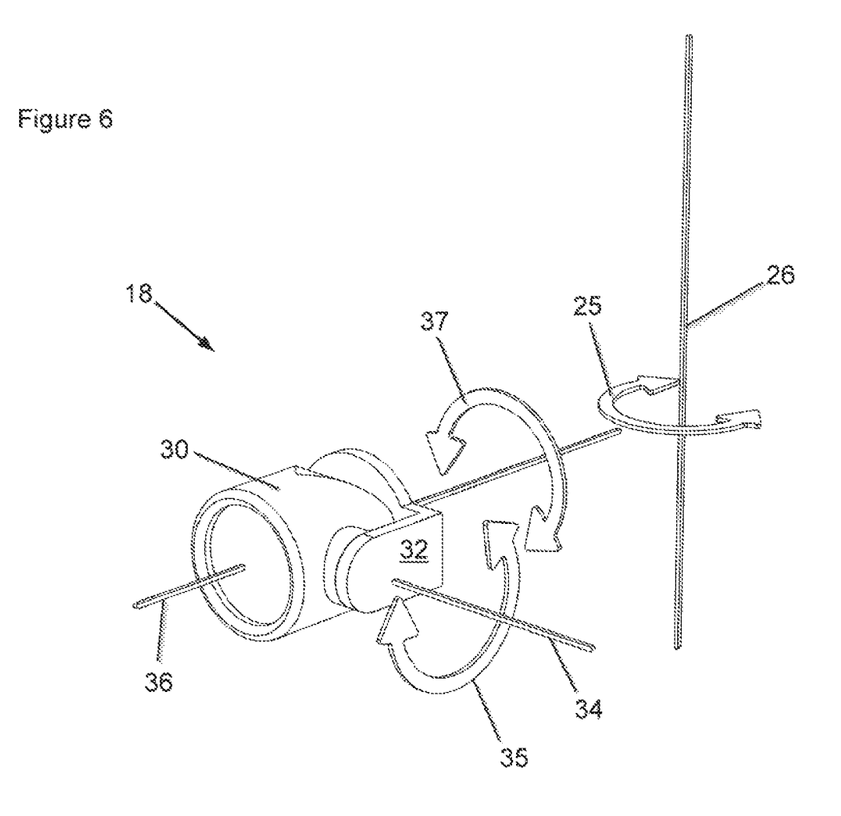
FIG. 6 is a perspective view of an exemplary camera gimbal mount system.

Referring now to FIG. 6, an illustrative exemplary camera assembly 18 is shown, including a camera and lens 30 pivotally attached to a first axis mount 32, which is pivotal about a pitch axis 34. Mount 32 is pivotally attached to a front portion of fuselage 12 (not shown here for clarity) and is pivotal about a roll axis 36. As mentioned above, fuselage 12 is pivotal about yaw axis 26. The camera assembly may also include an electrical connection for transmitting data to circuitry disposed elsewhere in the UAV. In some embodiments, a four lane MIPI camera serial interface (CSI) may be used, but any other suitable connectors and/or interfaces may be used in other embodiments. The UAV may also include one or more inertial measurement units (IMUs). In some embodiments, the camera assembly may include an IMU, or multiple IMUS. In some embodiments, the IMU may be used both to estimate the attitude of the gimbal, as well as provide data to the EIS circuitry or system for use in stabilizing image data.

In some embodiments, camera assembly 18 includes only a roll axis of movement (arrow 37) and a pitch axis of movement (arrow 35). This allows the gimbal mount to be fully enclosed within fuselage 12, since 2-axes of movement require a relatively small amount of room to operate. In some embodiments, the camera's yaw movement is provided by moving the entire fuselage 12 about yaw axis 26, as conveyed by arrow 25. Quadcopter 10 already provides yaw displacement by flight controls, so using this yaw movement of fuselage 12 as the yaw axis movement for camera assembly 18 saves on weight, complexity and size, and more importantly, allows camera assembly to be located within (and protected by) fuselage 12.

Figure 3:
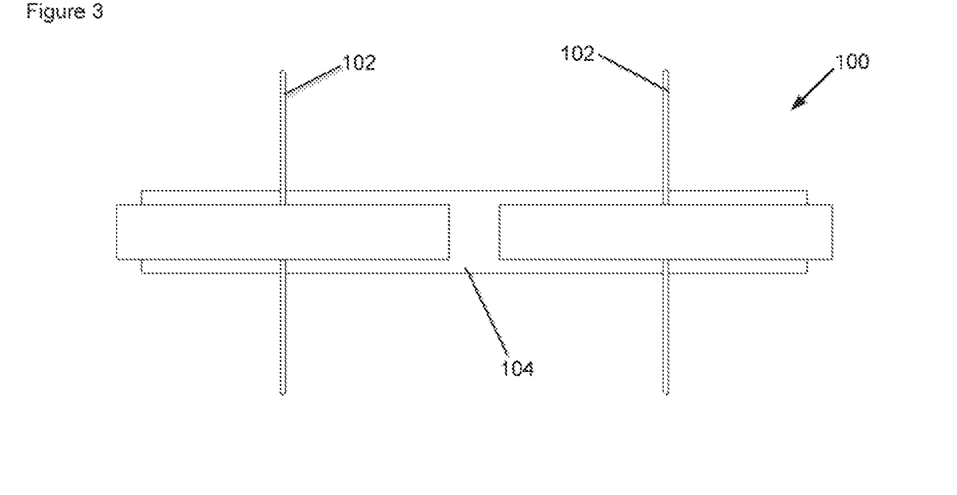
FIG. 3, is a side view of a simplified graphic illustration of an embodiment of a quadcopter showing motor/propellers mounted to a fuselage without any dihedral angle with respect to a vertical yaw axis.

In contrast, referring to FIG. 3, other embodiments of quadcopters such as quadcopter 100, whose thrust vectors 102 of each motor/propeller drives are parallel to each other, are able to generate a yaw displacement about a yaw axis by controlling relative speed (and the effective torque) of each motor. For the fuselage 104 of quadcopter 100 to remain in one orientation during flight with respect to ground or another fixed point, the sum of torque from each of the four motors must remain zero at any given time, assuming that there are no outside forces, such as wind. During a yaw displacement maneuver to rotate quadcopter 100 to a particular new yaw orientation, a controlled amount of torque from one or two motors is allowed to change with respect to the opposing motors. This imbalance of motor torque causes a non-zero sum of torque of the system, which is exerted about the yaw axis. In response, the fuselage will rotate in yaw, in the opposite direction, to balance the applied torque until the sum of the torque of the motors returns again to zero.

This system for yaw movement is limited by the control torque that can be exerted by this approach. As a result, the yaw control will be less precise, resulting in slower movements, drift, and/or oscillations. This instability, in turn, causes inaccurate and less sharp image capture by camera assembly 18.

Some cameras used in UAVs have a lens that can capture images within a 90 degree field of view, and use an image sensor that can include 4000 horizontal pixels. For a camera with these specifications, any movement of 0.02 degrees or more will result in "image shake" or blur, as each pixel subtends 90 degrees/4000 pixels. Quadcopters such as quadcopter 100 of FIG. 3 with vertical thrust vectors (motors and propellers mounted to the fuselage with zero dihedral angle) tend to have about 2 degrees of yaw movement, and likely more when flying in windy conditions.

In embodiments in which the camera assembly 18 relies on the yaw control of quadcopter 10 to provide full 3-axis stabilization, the yaw displacement of quadcopter 10 must be stable and accurate, with as little yaw drift as possible. The additional thrust vector about the yaw axis created by angling of the rotors creates additional control authority, which enables the platform to control yaw significantly more accurately. In some embodiments, yaw can be controlled within approximately 0.2 degrees or better with rotors canted at approximately 6 degrees.

Given that yaw movement of 0.2 degrees is still larger than the desired control range of 0.02 degrees, some slight movement can remain present with this approach. Electronic Image Stabilization (EIS) can be used to remove this last bit of yaw movement. EIS is a software based image stabilization which effectively shifts the electronic image from frame to frame of a video. This frame-to-frame shift can, under appropriate operating conditions, be sufficient to counteract undesired motion of the camera. Pixels outside the border of the visible frame can be used to provide a buffer for this correction. EIS can be used to remove distracting vibrations from videos by smoothing the transition from one frame to another. The impact of EIS on image quality increases with greater movement from frame to frame, as additional pixels need to be cropped and warp can be introduced into the image, especially during pitching movements.

In some embodiments, EIS can result in minimal image quality degradation when used with a two-axis gimbal controlling pitch and roll and rotors angled for improved yaw control, as the cropping can be significantly less than 1% of the total pixels, and the yaw movement alone will not introduce distortion.

Because intentional camera movement can be an appealing feature of video recorded by UAVs, the UAV control circuitry can feedforward information regarding the intentional camera movements to the EIS circuitry. The EIS circuitry may utilize this information so that it will not dampen intentional camera movements when processing video data, or will lessen the dampening of intentional camera movements when processing video data. These intentional camera movements may take the form of gimbal movements and/or flight movements of the UAV itself.

In quadcopter 10, motors 20*a* and 20*c* (located on the right side of fuselage 12) define a right-side motor pair, and motors 20*b* and 20*d* (located on the left side of fuselage 12) define a left-side motor pair. Each motor 20*a*-*d* includes a shaft that rotates about a shaft axis. The right-side motor pair defines a right-side motor plane which is a plane that intersects the shaft axis of each right-side motor 20*a* and 20*c*. Similarly, the left-side motor pair defines a left-side motor plane, which is a plane that intersects the shaft axis of each left-side motor 20*b* and 20*d*.

Figure 4:
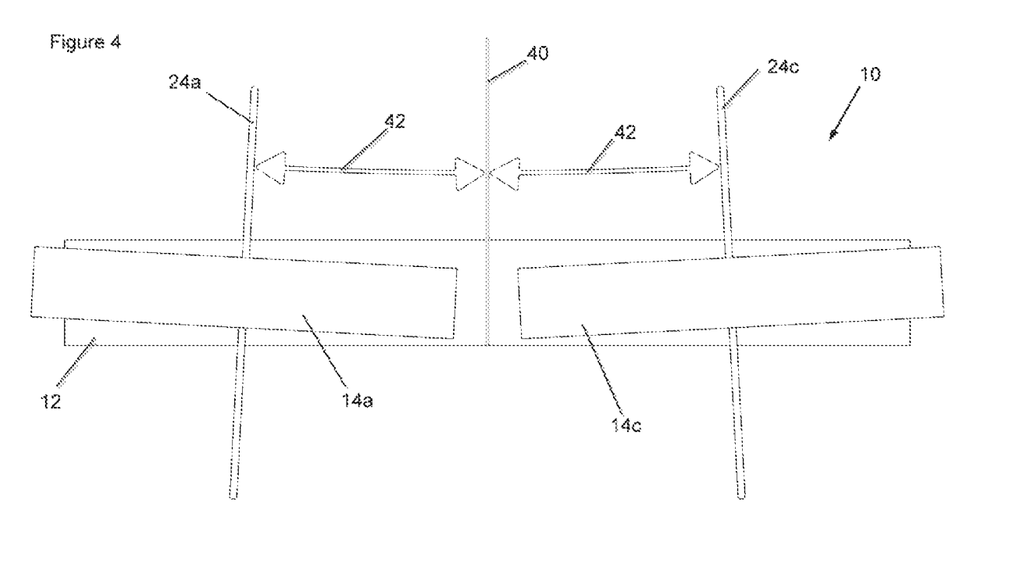
FIG. 4 is a side view of a simplified graphic illustration of an embodiment of a quadcopter such as the quadcopter of FIG. 1, showing details of a dihedral angle between the motor/propellers and with respect to a vertical yaw axis.
Figure 5:
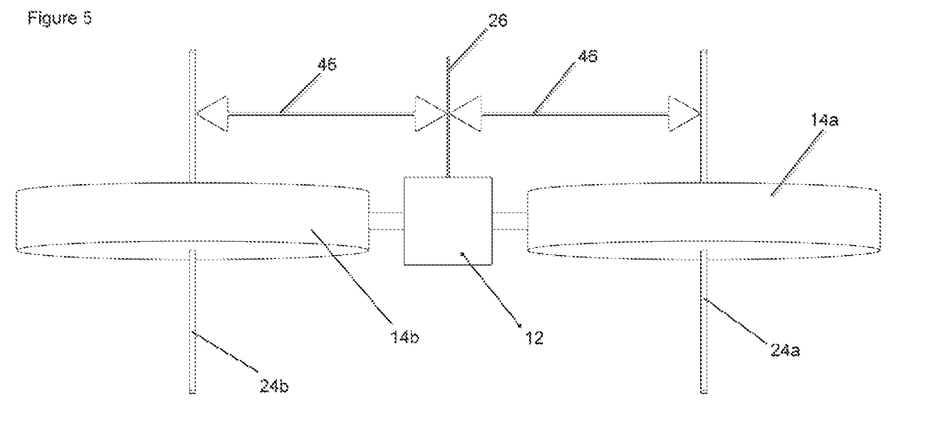
FIG. 5 is a front view of a simplified graphic illustration of the quadcopter of FIG. 4, showing mounting details of the motor/propellers with respect to a vertical yaw axis.

The motors 20*a* and 20*b* of the right-side motor pair are mounted to fuselage 12 with a slight inward pitch dihedral angle (called an "inwardly opposing pitch dihedral angle") with respect to a vertical reference axis 40. Thus, thrust vectors 24*a* and 24*c* of the right-side motors are directed towards each other, and intersect at a common point located above each right-side motor and, according to this embodiment, within the right-side motor plane. Similarly, the motors 20*b* and 20*c* of the left-side motor pair are mounted to fuselage 12 with a slight inward pitch dihedral angle (called an "inwardly opposing pitch dihedral angle") with respect to a left side vertical reference axis (not shown). Thus, thrust vectors 24*b* and 24*d* of the left-side motors are directed towards each other, and intersect at a common point located above each left-side motor and, according to this embodiment, within the left-side motor plane. As viewed from the right side of fuselage 12 (as shown in FIG. 4), the dihedral angle of each rotor 14*a* and 14*c* are such that the two rotors 14*a* and 14*c* are angled towards each other. This is referred to as an inwardly opposing pitch dihedral angle. The term "pitch" is used to define the orientation of the dihedral angle (in the pitch plane of vehicle movement). As shown in FIG. 5, there is no "roll" orientation dihedral angle applied to any of rotors 14*a*-*d*.

Figure 7:
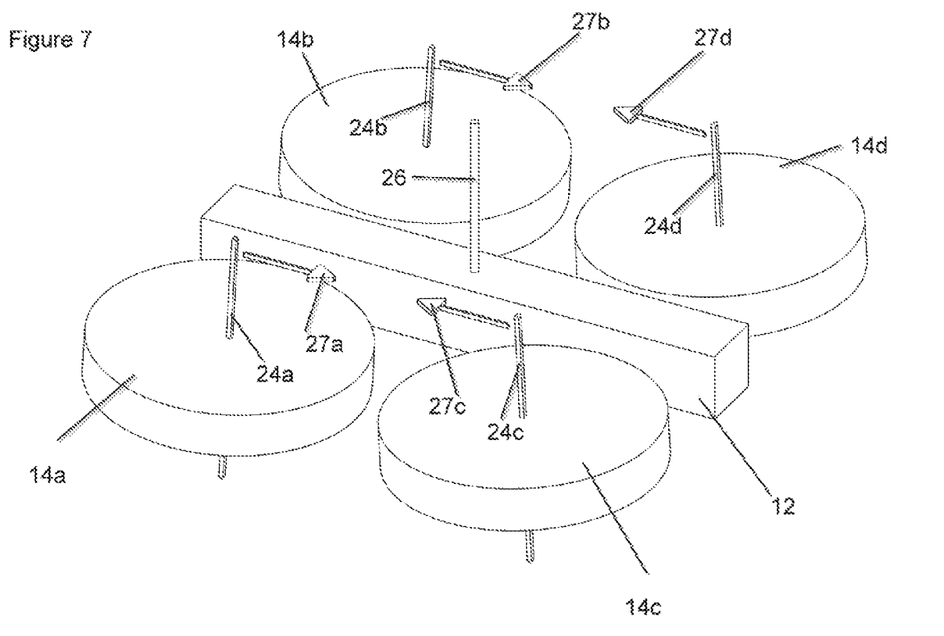
FIG. 7 is a perspective view of a simplified graphic illustration of the quadcopter of FIG. 4, showing mounting details of the motor/propellers with respect to the vertical yaw axis and showing horizontal thrust component arrows.

As illustrated in FIG. 7, the dihedral angle of each motor 20*a*-20*d* creates a horizontal component of thrust, which is conveyed by arrows 27*a*-27*d*, respectively. Generally, the greater the dihedral angle imparted to rotors 14*a*-*d*, the greater the horizontal thrust component, and up to a point, the greater the response and stability of yaw movement. The greater the horizontal thrust component, the less thrust will be available for vertical lift and the lower the overall efficiency.

As mentioned above, onboard controlling circuitry (not shown) selectively instructs the operation of each motor 20*a*-*d* and propeller 22*a*-*d* which, in turn, generates force vectors 24*a*-24*d* in a controlled manner that allows quadcopter 10 to follow a specific and desired flight path and/or airborne orientation. Horizontal thrust components 27*a*-27*d* of each thrust vector 24*a*-24*d* are used to provide a quicker and more stable response when controlling in the yaw orientation, about yaw axis 26.

In operation of the quadcopter, when a yaw displacement is desired, controlling circuitry instructs the motors to create a non-zero torque sum. The horizontal thrust component of each rotor 14*a*-*d* generated by the dihedral angle of the right side motor pair and the left side motor pair cause a moment to be created about yaw axis 26 which effectively allows for more responsive yaw displacement, and less yaw drift when a desired yaw angle of movement has been reached. Testing has shown that a dihedral angle of 6.5 degrees (with respect to yaw axis 26) results in a yaw drift angle of less than 0.2 degrees. The end result is a more stable, responsive and accurate yaw displacement, which yields more stable and sharper images of camera assembly 18.

Electronic Image Stabilization (EIS) works very well in combination with the rotors set at an inwardly opposing pitch dihedral angle, as described above, to ensure an improved image quality. Vibration dampening between rotors 14*a*-*d* and fuselage 12 may further help in reducing vibration to camera assembly 18, during flight.

Introducing a dihedral angle to both side motor/propellers will slightly decrease the maximum thrust available for vertical lift, since a small portion of the thrust is now being directed laterally by the dihedral angle. In some embodiments, a range of dihedral angle 42 which has been found to maximize yaw stability and minimize loss of lift efficiency is between 2.0° and 20.0°, as measured between the thrust vector of one motor 20a-d and vertical reference 40. Although the dihedral angle of each motor may vary, in some embodiments the angle of orientation can be common to all four motors 20a-d of quadcopter 10. In some embodiments, therefore, the included angle between the thrust vectors of two rotors can be between 2.0° and 40.0°.

Referring to FIG. 5, a front view of quadcopter 10 is shown, including a fuselage 12, a right-side rotor 14a, a left-side rotor 14b, thrust vector 24a, thrust vector 24b and a yaw axis 26. In some embodiments, thrust vectors 24a, and 24c (not shown in FIG. 5), which reside in right-side motor plane, are parallel to yaw axis 26 (that is, there is no roll-direction dihedral angle). Similarly, thrust vectors 24b, and 24d (not shown in FIG. 5), which reside in left-side motor plane is parallel to yaw axis 26 (that is, there is no roll-direction dihedral angle). Although in some embodiments, motors 20a-d have no roll-direction dihedral angles, in other embodiments they can have a roll-direction dihedral angle between 0 and about 10 degrees. Adding a roll dihedral angle to the motors will increase the yaw moment, but will also further reduce maximum lift thrust. In embodiments in which a dihedral angle is applied to motors 20a-d, in whichever orientation, the resultant thrust vectors of the motors should not intersect with the yaw axis if the motor is to be used for yaw correction in the manner described herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An unmanned aerial vehicle (UAV) comprising:
a UAV body;
a first rotor supported by the UAV body and oriented to generate thrust along a first thrust vector which does not intersect a yaw axis of the UAV body;
a second rotor supported by the UAV body and disposed on the same side of the UAV body as the first rotor, the second rotor oriented to generate thrust along a second thrust vector, the second thrust vector oriented at a fixed non-zero angle to the first thrust vector; and
a two-axis gimbal supported by the UAV body, the gimbal comprising a first axis mount pivotable about a roll axis of the UAV body and a second axis mount pivotable about a pitch axis of the UAV body.

2. The UAV of claim 1, wherein the UAV is configured to use field oriented control to control the first and second rotors.

3. The UAV of claim 1, wherein an included angle between the first and second thrust vectors is between 4 and 40 degrees.

4. The UAV of claim 1, additionally comprising:
a third rotor supported by the UAV body on the opposite side of the UAV body as the first rotor, the third rotor oriented to generate thrust along a third thrust vector which does not intersect a yaw axis of the UAV body, the third thrust vector parallel to the first thrust vector; and
a fourth rotor supported by the UAV body and disposed on the same side of the UAV body as the third rotor, the fourth rotor oriented to generate thrust along a fourth thrust vector, the fourth thrust vector oriented at an angle to the third thrust vector, the fourth thrust vector parallel to the second thrust vector.

5. The UAV of claim 1, additionally comprising a camera supported by the two-axis gimbal, wherein the camera is at least partially enclosed within the UAV body.

6. The UAV of claim 5, wherein the camera is at least partially enclosed within the front of the UAV body.

7. The UAV of claim 1, wherein the UAV body extends along a longitudinal axis, and wherein the yaw axis of the UAV body is substantially perpendicular to the longitudinal axis of the UAV body.

8. The UAV of claim 3, wherein the UAV is configured to use yaw control to provide camera stabilization along the yaw axis.

9. The UAV of claim 7, additionally comprising electronic image stabilization circuitry configured to process image data from an image sensor supported by the two-axis gimbal to stabilize the image data.

10. The UAV of claim 9, additionally comprising an inertial measurement unit, wherein the inertial measurement unit is configured to provide data to the electronic image stabilization circuitry, and wherein the UAV is configured to utilize the inertial measurement unit to estimate the attitude of the two-axis gimbal.

11. The UAV of claim 9, wherein the UAV is configured to use field oriented control to control the first and second rotors and transmit data regarding intentional movements of the UAV to the electronic image stabilization circuitry, and wherein the electronic image stabilization circuitry is configured to prevent dampening of intentional movements of the camera.

12. The UAV of claim 9, wherein the camera comprises a lens and an image sensor, and wherein the electronic image stabilization circuitry is disposed within the UAV body.

13. A quadcopter, comprising:
a fuselage defining a longitudinal axis and containing a battery and controlling circuitry;
two left-side rotors secured on the left side of said fuselage, the two left-side rotors fixed at respective inwardly opposing pitch dihedral angles; and
two right-side rotors secured on the right side of said fuselage, the two right-side rotors fixed at respective inwardly opposing pitch dihedral angles.

14. The quadcopter of claim 13, wherein said pitch dihedral angles are between 2.0 and 20 degrees as measured from the vertical.

15. The quadcopter of claim 13, further comprising a video camera located within said fuselage.

16. The quadcopter of claim 13, wherein the inwardly opposing pitch dihedral angles of the two left-side rotors lie within a first plane, and wherein the inwardly opposing pitch dihedral angles of the two right-side rotors lie within a second plane.

17. The quadcopter of claim 13, wherein the absolute values of the inwardly opposing pitch dihedral angles are equal.

18. The quadcopter of claim 13, further comprising a two-axis gimbal support secured to said fuselage and located substantially within said fuselage, the gimbal support comprising a first axis mount pivotable about the longitudinal axis and a second axis mount pivotable about a second axis normal the longitudinal axis.

19. The quadcopter of claim 18, further comprising a video camera secured to said two-axis gimbal support and located within said fuselage.

20. The quadcopter of claim 19, further comprising electronic image stabilization for electronically stabilizing said video camera output signal.

* * * * *